(No Model.)
D. L. GRAVES.
MEAT TENDERER.
No. 417,821. Patented Dec. 24, 1889.
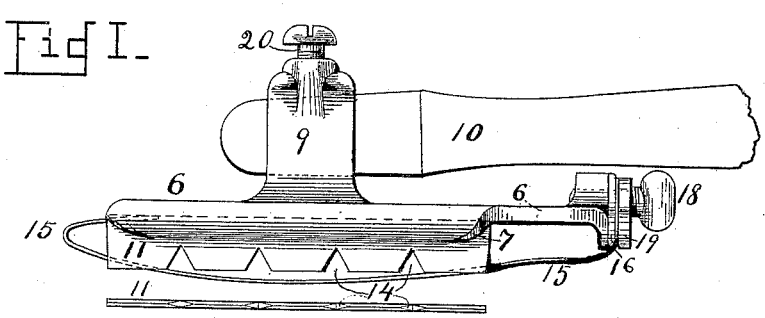
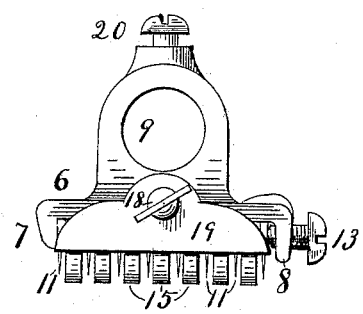
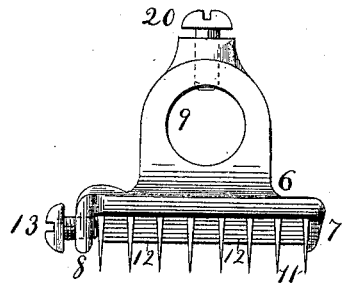
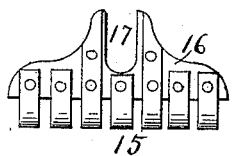
WITNESSES
S. E. E. Stevens
P. E. Stevens.
INVENTOR
David L. Graves.
W. X. Stevens
Attorney

UNITED STATES PATENT OFFICE.

DAVID L. GRAVES, OF LOUISVILLE, KENTUCKY.

MEAT-TENDERER.

SPECIFICATION forming part of Letters Patent No. 417,821, dated December 24, 1889.

Application filed July 17, 1889. Serial No. 317,770. (No model.)

*To all whom it may concern:*

Be it known that I, DAVID L. GRAVES, a citizen of the United States, residing at Louisville, in the county of Jefferson and State of Kentucky, have invented certain new and useful Improvements in Meat-Tenderers; and I do hereby declare the following to be a full, clear, and exact description of the invention, such as will enable others skilled in the art to which it appertains to make and use the same.

This invention relates to that class of devices called "meat-tenderers;" and its object is to reduce one or both faces of a slice of meat to a pulp for the purpose of making the same tender and easily masticated without loss of the nutritious juices of the meat.

To this end my invention consists in the construction and combination of parts, hereinafter described and claimed, reference being had to the accompanying drawings, in which—

Figure I is a side elevation of a meat-tenderer according to my invention. Fig. II is a view of the same at the handle end. Fig. III is a view of the opposite end without the springs, and Fig. IV is an end view of the springs and their shank.

6 represents the body-piece, which is of metal cast with a depending flange 7 at one side and two depending ears 8 at the opposite side, and with a socket 9 at its back, perforated to receive the handle 10.

11 represents a series of sharp-edged blades inserted between the flange 7 and ears 8, to rest upon the body 6, and separated by a series of metallic bars 12.

13 represents screws passing through the ears 8 to press the blades 11 and the interposed bars 12 against the flange 7 to hold the blades rigidly in the body when in service, and yet to permit their ready removal for grinding or thorough cleaning.

14 represents V-shaped notches in the edges of the blades, not sharpened at the sides of the V, in order, first, that the meat may not be cut into continuous strings, and, second, that the meat crowded into the V-angles and not cut will aid in separating the meat from the tenderer after each stroke.

15 represents a series of springs interposed between the blades and secured upon a shank 16, which is common to all the springs, and is provided with a slot at 17 to slide upon a binding-screw 18.

19 is a clamp-jaw secured to the body 6 by the screw 18, and adapted to press upon the shank of the springs by the action of the said screw. The shank, by means of the slot 17, may be raised or lowered to adjust the springs to the amount of penetration of blades and the force of pressure required, and be so fixed by the clamp.

20 is a binding-screw to hold the handle in its socket. The meat to be tendered should be placed upon a block or plank and struck all over its face in one or more directions with the edges of the blades, the tenderer being used like a hammer.

In some cases the device may be used without the springs. Then the blunt-edged angular notches in the blades will aid in removing the meat from the tenderer; but when the meat requires to be thoroughly disintegrated and reduced to a pulpy mass the springs serve their best purpose in pushing the meat from between the blades. The great improvement derived by this treatment of tough meat has been too often asserted to require further comment.

Having thus fully described my invention, what I believe to be new, and desire to secure by Letters Patent, is the following:

The combination of a body portion 6, a series of blades 11, means, substantially as described, for holding the blades to the body, a series of springs 15, interposed between the said blades and provided with a shank 16, common to all the springs and having a slot 17, and a screw-clamp for holding the said shank to the body, whereby the springs may be set and their shank rigidly fixed at the required height, and whereby the said springs may be readily released for removal, substantially as shown and described.

In testimony whereof I affix my signature in presence of two witnesses.

DAVID L. GRAVES.

Witnesses:
C. C. HOKE,
JACOB HULL.